July 21, 1953 E. M. FRANKEL 2,646,438
PROCESS OF PRODUCING REFINED FATS AND OILS
Filed Feb. 24, 1949
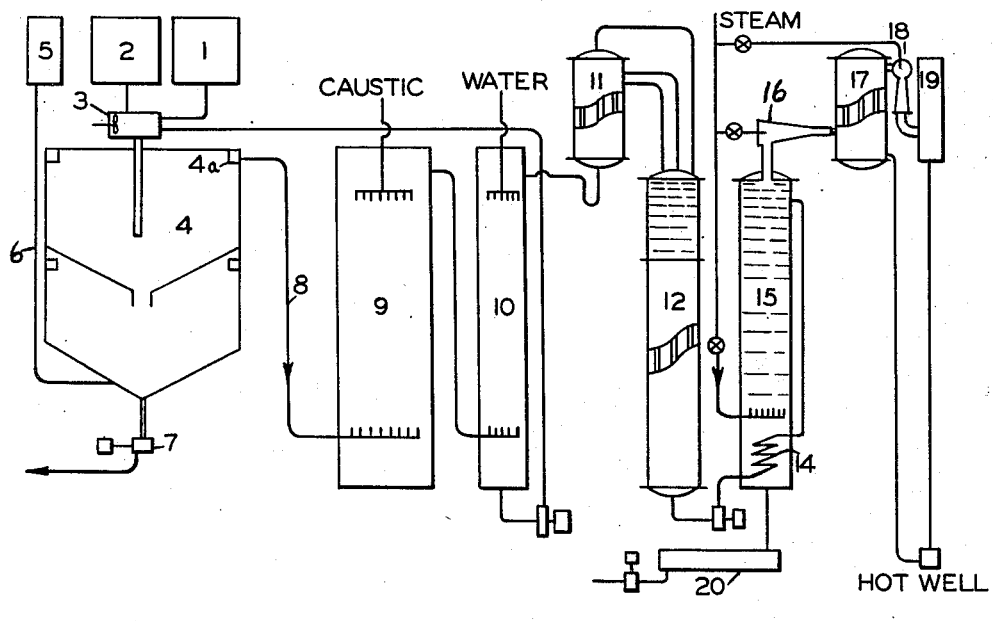
INVENTOR.
EDWARD M. FRANKEL
BY Patented July 21, 1953

2,646,438

UNITED STATES PATENT OFFICE 2,646,438

PROCESS OF PRODUCING REFINED FATS AND OILS

Edward M. Frankel, Nyack, N. Y.

Application February 24, 1949, Serial No. 78,081

4 Claims. (Cl. 260—426)

This invention relates to the production of purified oils and fats and in particular is directed to a novel continuous process for the production of neutral deodorized oils from seeds, meals and the like, utilizing solvents for the initial extraction of the oil from the oil bearing materials.

In the extraction of vegetable oil from seeds by means of the conventional hexane extraction process a crude oil is obtained as a primary product. This crude product requires further refining to remove the fatty acids, phosphatids, color bodies, gums, aldehydric substances and other undesirable constituents in order to obtain a neutral bland product suitable for edible and special industrial uses.

I have found that it is possible directly to produce a refined oil in a continuous process by utilizing the solvent action of hexane or the like to remove the oil from the oil bearing materials and directly to subject the relatively dilute solution of the oil in the extracting solvent to purification techniques that accomplish the desired result with maximum efficiency and minimum loss of neutral oil.

Accordingly, it is one of the principal objects of this invention to provide a continuous process for the production of neutral deodorized oils from seeds, meals and the like with improved efficiency and minimum loss of neutral oil at the side of primary production.

Another object of this invention is to make possible the direct production of refined oil even where the thruput is too small to be economical by the methods currently used.

Another object is to utilize the same equipment now employed for the production of crude oil to make deodorized, refined oil with additional equipment that will add only a very small amount to the capital equipment cost presently employed. Also, this process lends itself to superimposition on plants now in use to achieve a more advanced and desirable result.

Other objects and advantages of this invention will become apparent from the following more detailed description thereof, taken in connection with the accompanying drawing, which is a diagrammatic representation of a plant layout.

Referring to the drawing, the oil dissolved in hexane (about 25% oil by weight) hereinafter called miscella (produced in conventional extraction apparatus) is fed thru a storage tank 1 together with an acid binding substance, as for example a solution of soda ash, sodium sulfite, caustic soda, trisodium phosphate, lime, etc., from tank 2 into mixer 3 where all acidic components are neutralized and from which the mixture is fed to the central intake of a multi-tray washing thickener 4 in which the purified miscella separates and overflows thru launder 4a into line 8 which conveys it to washer 9 where it is washed countercurrently with dilute caustic soda to remove color bodies not soluble in the mild alkali previously used and other alkali soluble substances and finally thru washer 10 where it is washed with water. The sludge containing soaps lecithin gums etc. from thickener 4 is discharged thru slow piston pump 7 to suitable storage.

The washer miscella is then pumped to a conventional heat exchanger 11 and evaporator 12 for removal of the hexane at atmospheric or lower pressures and the residual oil containing a small amount of solvent is contacted in high vacuum (15–30 mm. Hg absolute pressure) with a current of superheated steam at about 400° F. for removal of the last traces of solvent. This high vacuum treatment is carried out in the conventional apparatus using a plate column 15, heat exchanger 14, jet compressors 16 and 18 and condensers 17 and 19.

The finished oil leaves the process thru a cooler 20, where it is cooled to a temperature low enough to prevent oxidation by the air in final storage tank.

It is preferable that the acid binding substance used be of a mild alkaline character as for example soda ash or sodium sulfite or phosphate so as to prevent saponification of neutral oil when an excess of caustic alkali is used. There is an advantage in using sodium sulfite, inasmuch as the sodium bisulfite produced in the neutralization of the free fatty acids has the desirable effect of binding aldehydic or ketonic substances which undesirably flavor the oil and must be ordinarily removed by high temperature and high vacuum procedures. This alkali washing also keeps the hexane purified so that undesirable volatile acid substances are removed and keep the reclaimed solvent adequately purified so that there is no build-up of these impurities in the continued recycling of the solvent.

The removal of acidic substances from the miscella is more easily accomplished than when the oil is undiluted, and correspondingly the entrainment of neutral oil in the soap layer is reduced because of the greater fluidity of the mixture and because of the improved separation that occurs in a washing thickener. This process has the advantage over centrifugal refining devices in that no high speed apparatus is used and that aside from the high cost of equipment and power there is no tendency to reemulsification which is sometimes encountered.

The treated miscella lends itself to chromatigraphic separation of color and flavors using various adsorbents such as activated carbon, alumina, fuller's earth, bentonite, etc., and can also be used in the solvent separation of more unsaturated from less unsaturated oils by immiscible solvents such as furfural, alcohol, and many others used commonly in the petroleum industry. It thus becomes possible by means of this invention to facilitate the separation of edible oil fractions from more unsaturated fractions desirable for non-edible uses as a part of the original manufacture of the primary oil. By such an additional treatment the edible oil fraction becomes more valuable for hydrogenation and interesterification techniques to produce oils of desired hardness and plasticity. This can be accomplished by an additional continuous extractor in the circuit between the water washer 10 and the evaporator 12.

The sludge of soap and other water miscible substances may be washed with a small amount of solvent, as, for example, the solvent used in producing the miscella, fed from tank 5 through line 6. The separated sludge is continuously removed with a slow acting piston pump 7 and sent to an acidifying tank to recover fatty acids.

The purification of oils has heretofore been economically carried on only in larger installations and using larger quantities of oil than are produced by even the largest solvent extraction units. This process because of its simplicity makes available to the primary oil producer all the returns now enjoyed by the refiner.

It will be understood that the process hereinabove described is merely illustrative of the method of accomplishing this invention and, accordingly, that the appended claims are to be construed as defining the invention within the full spirit and scope thereof.

I claim:

1. A process of producing a purified oil from miscella, which comprises: treating said miscella with sodium sulfite whereby a sludge is formed; separating the sludge formed upon treatment with the sodium sulfite; treating the miscella, after removal of the sludge, with a dilute solution of caustic alkali stripping the solution from the miscella after treatment with the dilute solution of caustic alkali, to obtain the oil; and effecting deodorization of the oil while removing the last traces of solvent.

2. A process of producing purified oil and miscella, which comprises: treating said miscella with sodium sulfite; separating the sludge formed upon treatment of said miscella with the sodium sulfite; treating the miscella, after removal of the sludge, with an adsorbent; stripping the solvent from the adsorbent-treated miscella to obtain the oil; and effecting deodorization of the oil while removing the last traces of solvent.

3. A process of producing purified oil from miscella, which comprises: treating said miscella with sodium sulfite, separating the sludge formed upon treatment with the sodium sulfite; treating the miscella, after removal of the sludge, with a dilute solution of caustic alkali; fractionally extracting less saturated from more saturated fatty components of the miscella by solvents in which less saturated components are more soluble; and treating the separated fractions to remove solvents from each such fraction, and fully deodorizing the more saturated components while removing the last traces of solvent therefrom.

4. A process of producing purified oil from miscella, which comprises: treating said miscella with a solution of sodium sulfite whereby the free acid in said miscella is neutralized, and a sludge is formed; separating the aforesaid sludge from the miscella; treating the miscella after the removal of the aforesaid sludge with a decolorizing agent; stripping the solvent from the decolorized miscella to obtain the oil; and effecting deodorization of the oil while removing the last traces of solvent.

EDWARD M. FRANKEL.

References Cited in the file of this patent

UNITED STATES PATENTS

| Number | Name | Date |
|---|---|---|
| 1,538,509 | Bergier | May 19, 1925 |
| 2,200,391 | Freeman | May 14, 1940 |
| 2,260,731 | Thurman | Oct. 28, 1941 |
| 2,288,441 | Ewing | June 30, 1942 |
| 2,355,605 | Ruthruff et al. | Aug. 15, 1944 |
| 2,374,924 | Clayton | May 1, 1945 |